Figure 1:
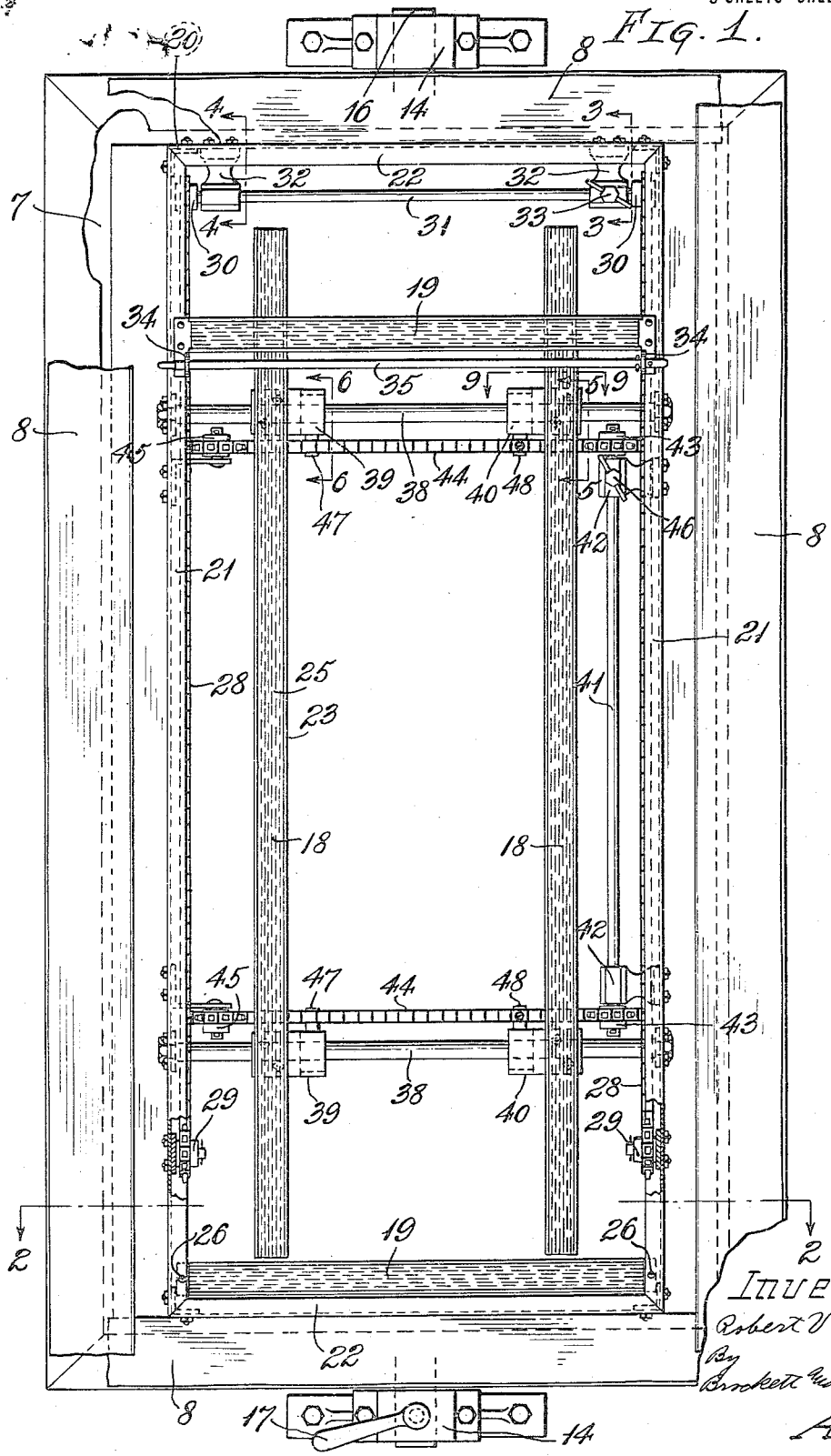

R. V. LYON.
CURTAIN STRETCHER AND DRIER.
APPLICATION FILED JULY 2, 1917.

1,285,274.

Patented Nov. 19, 1918.

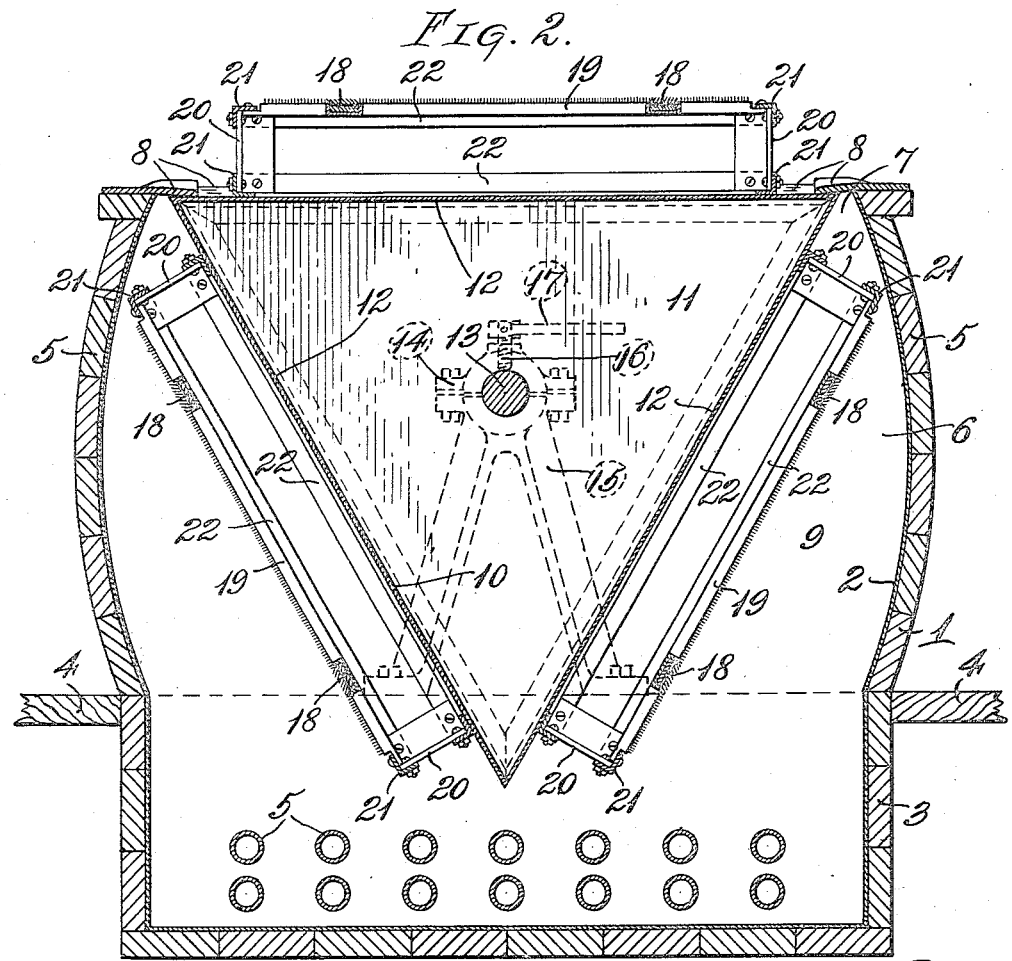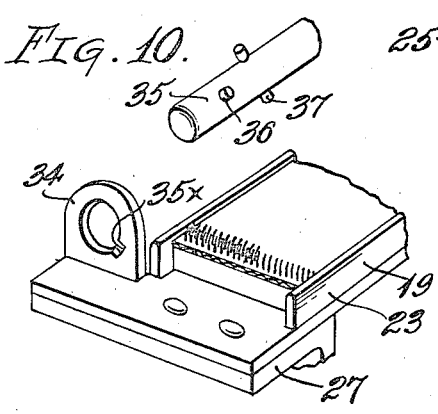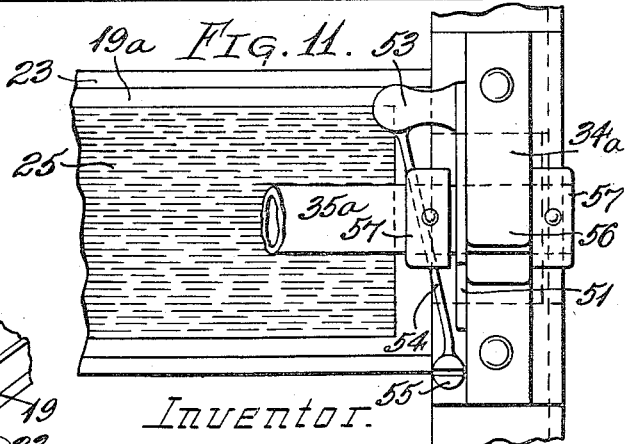

R. V. LYON.
CURTAIN STRETCHER AND DRIER.
APPLICATION FILED JULY 2, 1917.
1,285,274.
Patented Nov. 19, 1918.
3 SHEETS—SHEET 3.
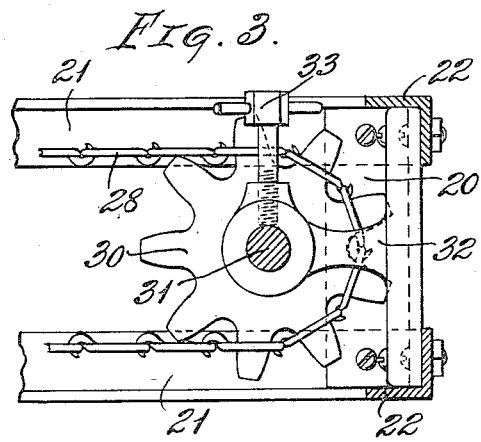
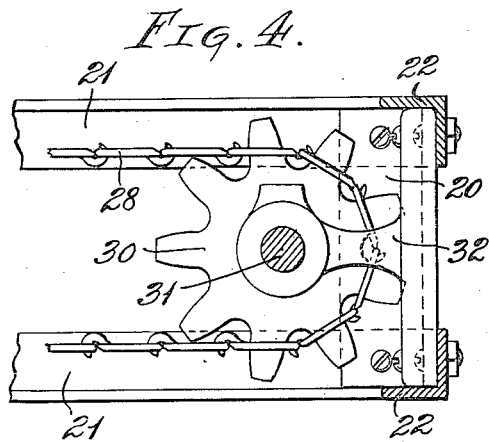
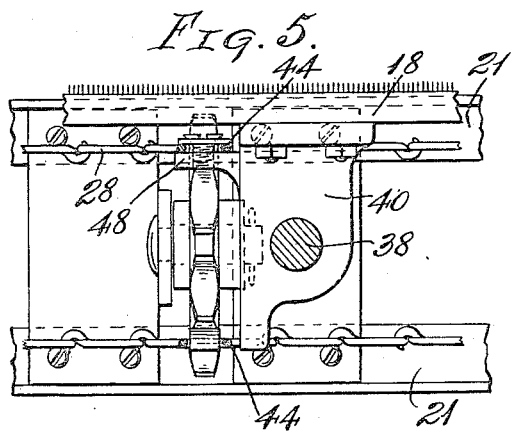
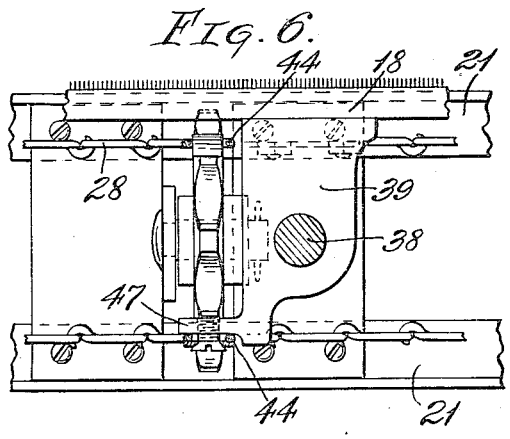
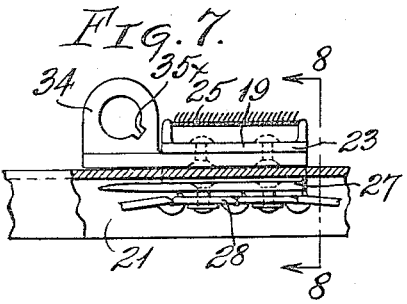
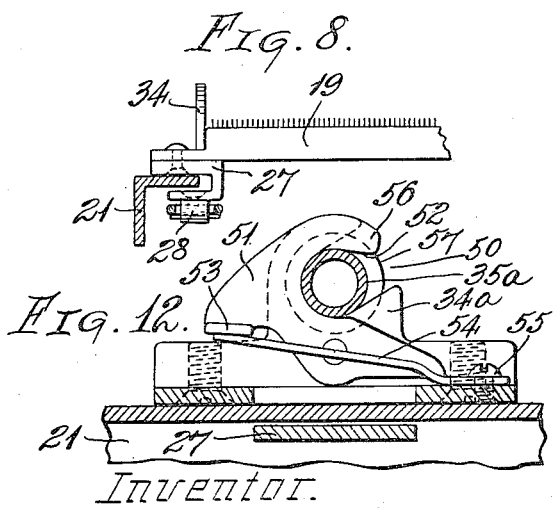
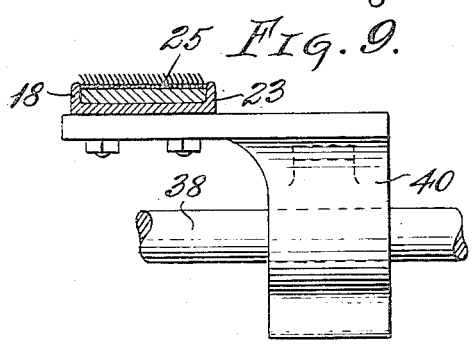
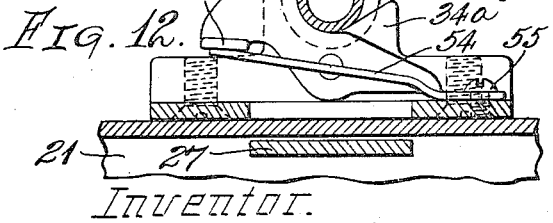
Inventor.
Robert V. Lyon
By Brockett and Hyde
Att'ys.

UNITED STATES PATENT OFFICE.

ROBERT VALENTINE LYON, OF BUFFALO, NEW YORK, ASSIGNOR TO THE AMERICAN LAUNDRY MACHINERY COMPANY, OF NORWOOD, OHIO, A CORPORATION OF OHIO.

CURTAIN STRETCHER AND DRIER.

1,285,274.    Specification of Letters Patent.    Patented Nov. 19, 1918.

Application filed July 2, 1917. Serial No. 178,183.

*To all whom it may concern:*

Be it known that I, ROBERT VALENTINE LYON, citizen of the United States, residing at Buffalo, in the county of Erie and State of Ohio, have invented certain new and useful Improvements in Curtain Stretchers and Driers, of which the following is a specification.

This invention relates to curtain stretchers and driers and more particularly to devices of this kind for use in laundries or wherever a large number of curtains are handled.

The object of the invention is to provide an improved device of this kind which enables curtains to be handled more conveniently; whose drying capacity is commensurate with the ability of the operator to apply the curtains to the stretching device, thereby enabling an operator to work continuously at the device and to replace finished dried curtains upon the stretching device with other curtains to be stretched and dried as rapidly as the stretching device comes around to the loading station; which insures convenient stretching of the curtain and insures a true rectangular shape or form, thereby enabling the curtains of a pair to be stretched and dried to the same form; and, finally, a device of this kind wherein the longitudinally extending bars for receiving the side edges of the curtains are moved uniformly toward and from each other from the opposite sides of the frame, so that the two curtain bars are always equally accessible from opposite sides of the frame.

Further objects of the invention are in part obvious and in part will appear more in detail hereinafter.

The invention comprises the curtain stretcher and drier hereinafter described and claimed.

In the drawings which represent one embodiment of the invention Figure 1 is a plan view partly broken out to expose the interior parts; Fig. 2 is a cross sectional elevation on the line 2—2 Fig. 1, looking in the direction of the arrows; Fig. 3 is a detail cross section, on a larger scale, on the line 3—3 Fig. 1, looking in the direction of the arrows; Fig. 4 is a similar view on the line 4—4 Fig. 1; Figs. 5 and 6 are similar views upon the lines 5—5 and 6—6, respectively, Fig. 1; Fig. 7 is a detail end view of one of the transversely extending curtain holding members; Fig. 8 is a detail cross sectional view on the line 8—8 Fig. 7; Fig. 9 is a detail cross sectional view on the line 9—9 Fig. 1; Fig. 10 is a detail perspective view illustrating one end portion of a curtain holding bar; Fig. 11 is a plan view, showing one end of a modified form of curtain hem holding bar and its connections to the adjustable bar; and Fig. 12 is an end view, partially in section, thereof.

Referring to Fig. 2, 1 indicates the main outer casing or jacket, which may be of any suitable form or construction and is carried by a suitable support. As illustrated said casing is built up of wood with an inner metal lining 2 so as to be moisture proof. The lower portion 3 of the casing is in a pit or is otherwise supported at or below the level of the floor 4 and in said lower portion are located a series of heating pipes or coils 5 connected to a source of heating medium, such as a source of steam. The upper portion of the casing has two curved side walls 5 and two opposite straight end walls 6, while its extreme top is provided with an opening 7, around whose edges is located a flexible sealing or closing member to coöperate with an inner frame, as will more fully appear, to prevent steam or moisture rising in the face of the operator while applying curtains to the stretching device. This sealing member on the frame shown, comprises a series of canvas or other flexible strips 8 attached to the upper edges of the casing walls and whose inner edges project into the opening 7.

The chamber 9 within the upper portion of the casing receives the inner frame 10 on which are placed the curtains to be stretched and dried. This inner frame comprises a hollow closed sheet metal member having end walls 11 and a series of side walls 12, any suitable number of which may be used. In other words, the cross sectional shape of the frame may be triangular, square, pentagonal, or any other shape, to provide a series of flat faces on the outside of said inner frame member uniformly spaced around its periphery and to each end of which is attached a set of curtain holding and receiving devices.

In the device shown in the drawings the inner frame is triangular in cross section as appears on Fig. 2.

The inner frame is rotatably mounted in the outside casing or jacket and is so located therein that each of the several side walls 12 of the inner frame in turn comes to a horizontal position across the opening 7 at the top of the casing, in which position the sealing flaps 8 extend over the edges of the frame and completely seal or close the opening 7 for the purpose hereinafter stated, but said flaps are sufficiently flexible so that they are easily pushed out of the way by the rotating frame.

The inner frame 10 is provided with a horizontal shaft extending clear through the same or with stub shafts 13 at its ends which project through openings in the outer casing and are journaled in supports 14 at the upper ends of standard 15 resting on the floor. The bearing on one of said standards 15 is provided with a threaded opening to receive a clamp screw 16 whose inner end engages shaft member 13, and whose outer end is provided with an operating handle 17, by means of which it may be tightened up to clamp the rotating frame 10 in any position to which it may be adjusted.

On each of the side walls 12 of the inner frame is located a set of curtain holding and stretching devices now to be described. As said devices are identical, a description of one will suffice for all.

Each curtain holding device comprises two longitudinally extending side bars 18 to receive the side edges of the curtain and two transversely extending end bars 19 to receive the end edges of the curtain. Both sets of bars are suitably supported some distance from the walls 12 of the inner frame 10 so that when the stretched curtain is in chamber 9 the heated air can circulate freely on both sides of the curtain and more readily dry the same, and furthermore, the curtain holding frame at the loading station is spaced far enough away from the inner frame 10 so that the damp curtain being applied thereto will not become dry before it is fully and properly stretched on the stretcher.

At the four corners of each of the side walls 10 are located upstanding angle members 20, suitably spaced and attached to a wall 10 and which in turn support the longitudinally extending side frame angle irons 21 and end angles 22.

Except as hereinafter noted, all four of the curtain holding bars 18, 19 are of the same construction, each being formed of a channel member 23 in which is fastened a sheet of card cloth 25. The latter is a well known material formed of a woven or other fabric with a very large number of small closely spaced fine points or pins standing up at a slight angle to its surface, the pins or points on each of the four curtain holding bars being inclined outwardly from the center of the frame.

The two side bars 18 are adjustable simultaneously and by the same means with a uniform movement toward and from each other, so that both of said members are always spaced the same distance from the two sides of the frame for whatever size adjusted. Both of the two end bars 19 may also be adjustable in the same manner, but as shown one of the said members 19 is stationary and is attached by screws, bolt or the like 26, to the side frame members 21. The other end member is provided at its opposite ends with channel members 27 opening outwardly and embracing the inwardly extending flanges of the side frame members 21 which forms guides for the movable bar 19 as shown in Fig. 8. The channel members 27 are also secured to the upper bights of two endless chains 28 passing over idler sprockets 29 near one end of the frame and at their opposite ends over sprockets 30 fixed to the opposite ends of a shaft 31 journaled in brackets 32 attached to the frame. One of said brackets is provided with a set screw 33 whose inner end engages shaft 31. In stretching the curtain one end is secured to the card cloth on the stationary bar 19, as by patting it down, with a bristle brush. The other end of the curtain may then be attached to the movable bar 19 which is pulled toward the end of the frame to stretch the curtain. The sprockets and chains cause the movable member 19 to maintain a parallel relationship with its companion at the opposite end of the frame. When the curtain is fully stretched the screw 22 is tightened up to maintain the end stretch.

Some curtains have a hem at one end. For more conveniently handling such curtains the adjustable bar 19 at both ends is provided with upstanding perforated ears 34 to receive a small rod 35. The opening in one of said ears is provided with a buttonhole slot 35ª through which can be passed a radial pin or projection 36 on the rod 35 after which said rod can be turned one quarter of a revolution to lock it in place. A pin 37 on the rod prevents it from being pushed in too far.

Figs. 11 and 12 illustrate a modified form of curtain hem holding bar. In this construction the adjustable or movable end bar 19ª carries the card cloth, as before, and at one end, not shown, is provided with a perforated upstanding ear similar to the ears 34 before described. At its other end said bar carries an upstanding ear 34ª having an open slot 50 on one side. Said ear carries a pivoted latch 51 provided with an opening or slot 52 in one side and with a laterally extending projection or thumb piece 53, normally pressed upward, and to the position shown in Fig. 12 by the spring 54 held to the bar 19ª by screw 55. In this position the nose 56 of the latch lies opposite and partially closes opening 50 in the ear 34ª. The hem holding bar or rod 35ª in this case is a small tube to which are rigidly secured, as by through pins or rivets, two collars 57.

With this construction the bar 35ª can be inserted in the hem of the curtain and one of its ends inserted in the plain opening in the ear on one end of the bar 19ª. The thumb piece 53 is then depressed to expose the opening 50 enabling the hem holding bar to be inserted into position in the ear 34ª. Release of the latch 51 allows it to spring to its position shown in Fig. 12 in which position it locks the bar 35ª in place. To release the bar the latch is depressed, as will be readily understood.

The two side bars 18 are supported by stationary cross bars or rods 38 located near the ends of the frame and are provided with depending brackets slidable upon said rods. The brackets for the two bars are slightly different. One bar 18 at the left in Fig. 1 has two brackets 39 while the other bars at the right in Fig. 1 has two brackets 40. At one side of the frame is located a longitudinally extending shaft 41 journaled in bearings 42 carried by the frame, said shaft carrying two sprockets 43 over which pass endless chains 44 traveling over idler sprockets 45 at the other side of the frame. The brackets 39 of one bar are also provided with arms 47 fastened to the lower bights of the chains while the brackets 40 of the other side bar are provided with arms 48 attached to upper bights of the chain. Consequently the two side bars 18 move uniformly toward and from opposite sides of the frame and are maintained in parallel relationship throughout their range of adjustment.

No operating levers or mechanism are necessary for any of the adjusting members of this stretcher and drier. In operation the curtain is placed on a stretcher and is secured at its ends to the end bars, is then stretched endwise by pulling on the movable end bar and after adjusting its side edges to the side bars is stretched sidewise by pulling on the side bars. Both sets of bars may be maintained or held in any adjusted position by turning up the clamp screws 33 and 46. While one curtain is being applied, two curtains are within the heating chamber 9, one receiving its second period of heat and the other its first. When the fresh curtain is fully stretched the clamp screw 16 is released and one side of the frame 10 is pushed down so as to turn said frame in its support, thereby advancing the newly stretched curtain into the drying chamber and withdrawing a dry curtain therefrom.

The apparatus is simple and can be manipulated continuously by one or two operators, its drying capacity being sufficient to keep pace with the ability of the operators to supply damp curtains to the frames.

What I claim is:

1. Apparatus of the character described, comprising a stationary casing having a top opening, and an inner frame mounted in said casing and provided with a series of circumferentially spaced walls, each of said walls carrying curtain stretching means, said frame being rotatable in said casing to expose any of said curtain stretching means above said opening.

2. Apparatus of the character described, comprising a stationary casing provided with a top opening, a closed hollow frame rotatably mounted within said casing and provided with several outer walls spaced circumferentially around its axis, and curtain stretching means carried by and spaced from each of said walls.

3. Apparatus of the character described, comprising a stationary casing provided with a top opening, a closed hollow frame rotatably mounted within said casing and provided with several outer walls spaced circumferentially around its axis, curtain stretching means carried by and spaced from each of said walls, and means at edges of the opening in said casing and coöperating with each of said walls to close the casing opening.

4. Apparatus of the character described, comprising a stationary casing provided with a top opening, a closed hollow frame rotatably mounted within said casing and provided with several outer walls spaced circumferentially around its axis, curtain stretching means carried by and spaced from each of said walls, and a series of flexible flaps adapted to permit said frame to be rotated through said opening and arranged to close said opening when one of said walls is in the same plane as said opening.

5. Apparatus of the character described, comprising a hollow casing, a frame rotatable therein and provided with a series of walls circumferentially spaced about its axis, each of said walls carrying curtain stretching means, said means comprising adjustable end bars to receive the curtain ends, and transversely adjustable curtain holding side bars movable uniformly toward and from each other.

6. Apparatus of the character described, comprising a hollow casing, a frame rotatable therein and provided with a series of walls circumferentially spaced about its axis, each of said walls carrying curtain stretching means, said means comprising adjustable end bars to receive the curtain ends, transversely adjustable curtain holding side bars movable uniformly toward and from each other, and means for clamping said side and end bars in any adjusted position.

7. Apparatus of the character described, comprising a hollow casing, a frame rotatable therein and provided with a series of walls circumferentially spaced about its axis, each of said walls carrying curtain stretching means, said means comprising adjustable end bars, means for clamping the same in any adjustable position, guide bars, side bars slidable thereon, and a transversely extending endless chain connected to said side bars.

8. Apparatus of the character described, comprising a hollow casing, a frame rotatable therein and provided with a series of walls circumferentially spaced about its axis, each of said walls carrying curtain stretching means, said means comprising adjustable end bars, means for clamping the same in any adjustable position, guide bars, side bars slidable thereon, and a transversely extending endless chain connected to said side bars, one of said bars being connected to each bight of the chain.

In testimony whereof I affix my signature.

ROBERT VALENTINE LYON.

Witnesses:
N. KEEFE,
I. DU MARS.